Feb. 21, 1933.  N. P. HARSHBERGER  1,898,989
SHINGLE
Filed May 11, 1928  4 Sheets-Sheet 1

INVENTOR:
Norman P. Harshberger
By E. J. Andrews
Att'y.

Feb. 21, 1933.  N. P. HARSHBERGER  1,898,989
SHINGLE
Filed May 11, 1928     4 Sheets-Sheet 2

INVENTOR:
Norman P. Harshberger
By E. J. Andrews
Atty.

Feb. 21, 1933.   N. P. HARSHBERGER   1,898,989
SHINGLE
Filed May 11, 1928   4 Sheets-Sheet 3
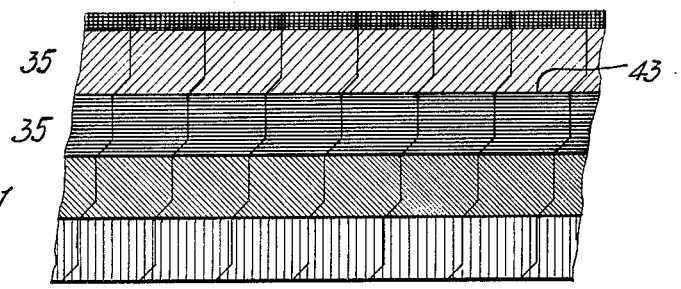
Fig. 11
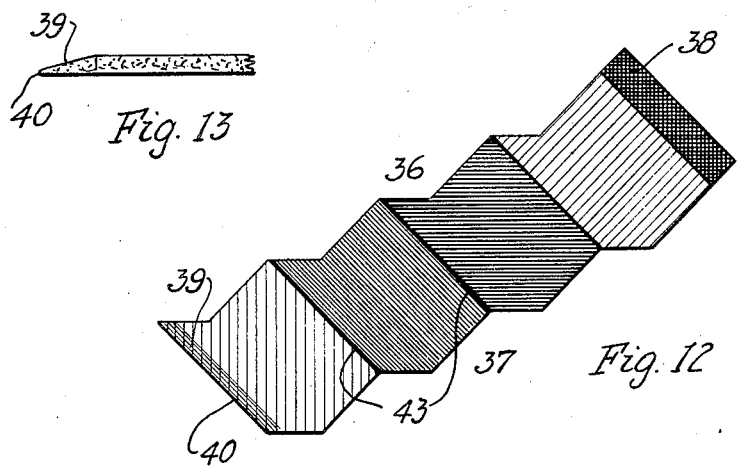
Fig. 13
Fig. 12
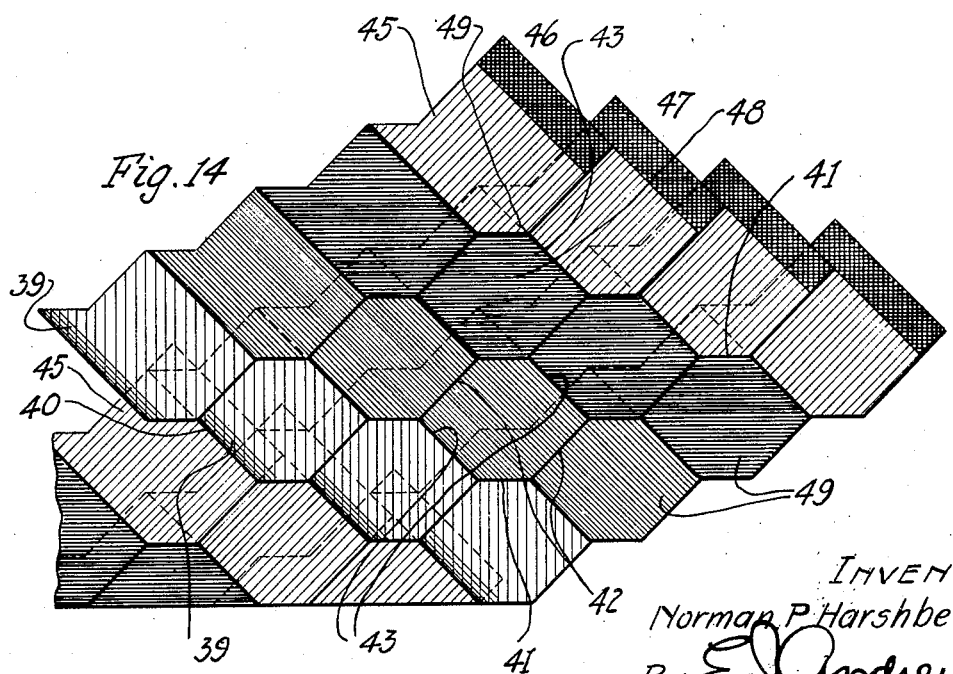
Fig. 14
INVENTOR:
Norman P. Harshberger
By E. J. Andrews
Atty.

Feb. 21, 1933. N. P. HARSHBERGER 1,898,989
SHINGLE
Filed May 11, 1928 4 Sheets-Sheet 4

INVENTOR:
Norman P. Harshberger
By E. J. Andrews
Atty.

Patented Feb. 21, 1933

1,898,989

UNITED STATES PATENT OFFICE

NORMAN P. HARSHBERGER, OF CHICAGO, ILLINOIS, ASSIGNOR TO BAKELITE BUILDING PRODUCTS COMPANY, INC., OF NEW YORK, N. Y., A CORPORATION OF DELAWARE

SHINGLE

Application filed May 11, 1928. Serial No. 277,074.

This invention relates to roof coverings of any ordinary nature, such as composition strips, or shingles composed of metal, asbestos or any other material. One of the objects of the invention is to provide a novel and pleasing appearance when the strips are laid on a roof, and this is accomplished not only by the markings of the strips themselves but also by the shape and form of the strips. At the same time a further object is to provide such markings and shapes of the strips or shingles as to allow them to be very conveniently and cheaply manufactured. One of the objects in this regard is to provide for forming and marking the web in a convenient manner and then for cutting the web so as to produce the strip with as little waste as possible and in other respects to reduce the expense and labor of cutting. Other objects of the invention will be understood from a consideration of the accompanying drawings and the following description thereof.

Throughout this specification the word "shingle" will be used to include any form of roofing pieces, whatever the shape may be.

Figure 1:
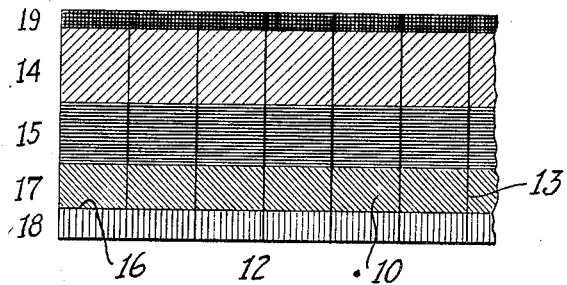
Figure 2:
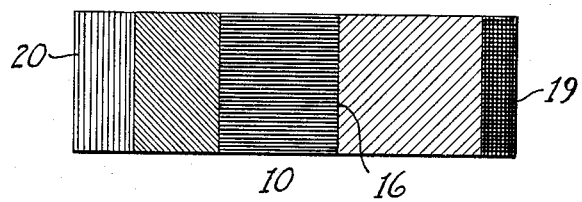
Figure 3:
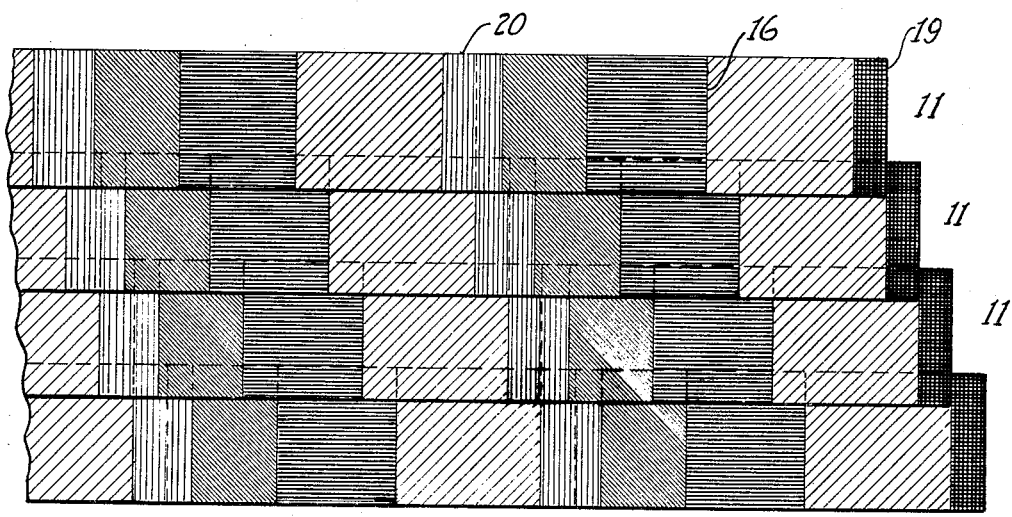
Figure 4:
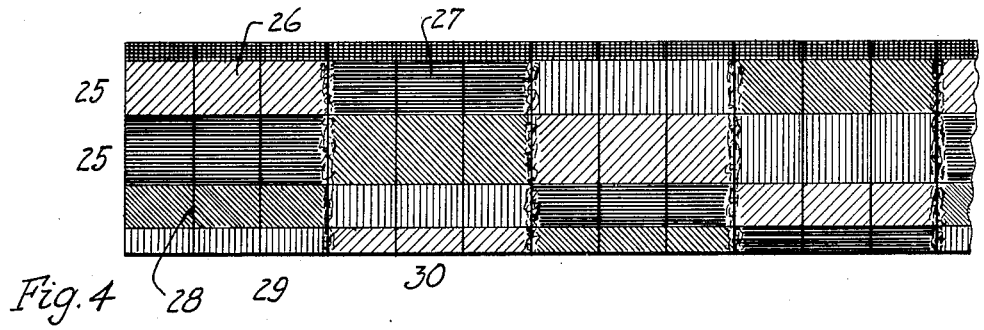
Figure 5:
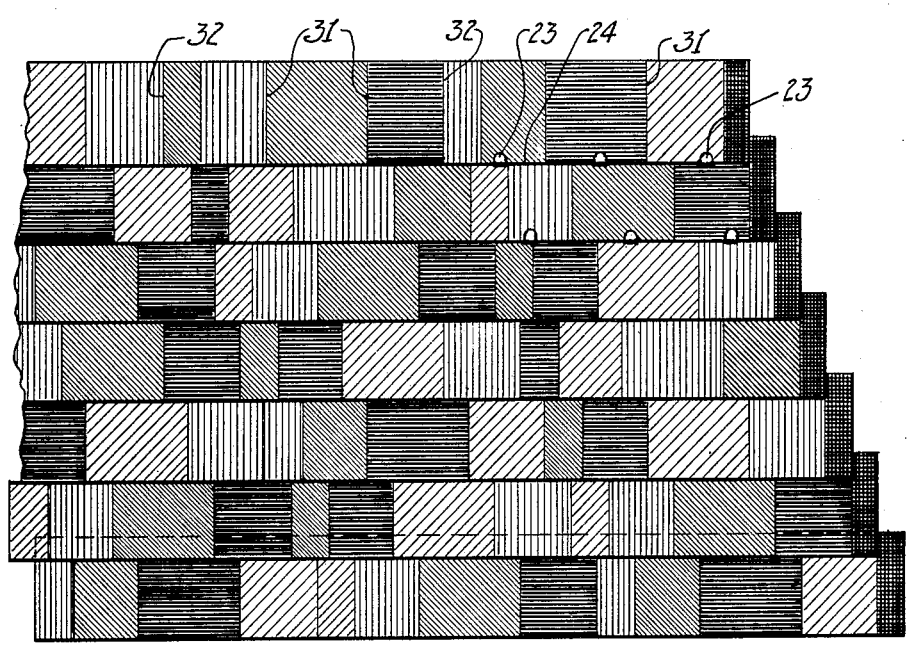
Figures 7, 8:
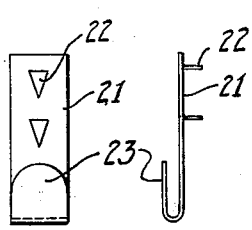
Figure 15:
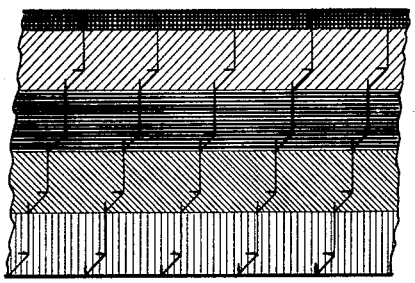
Figure 16:
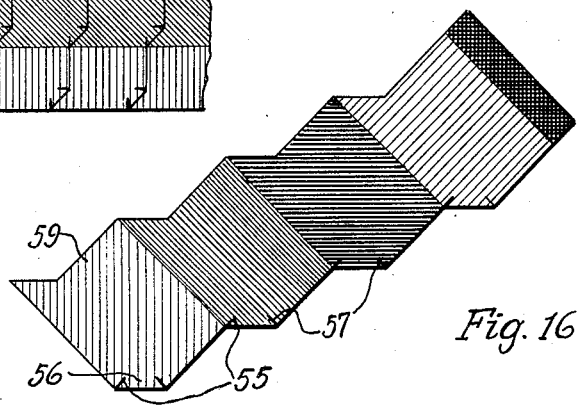
Figure 17:
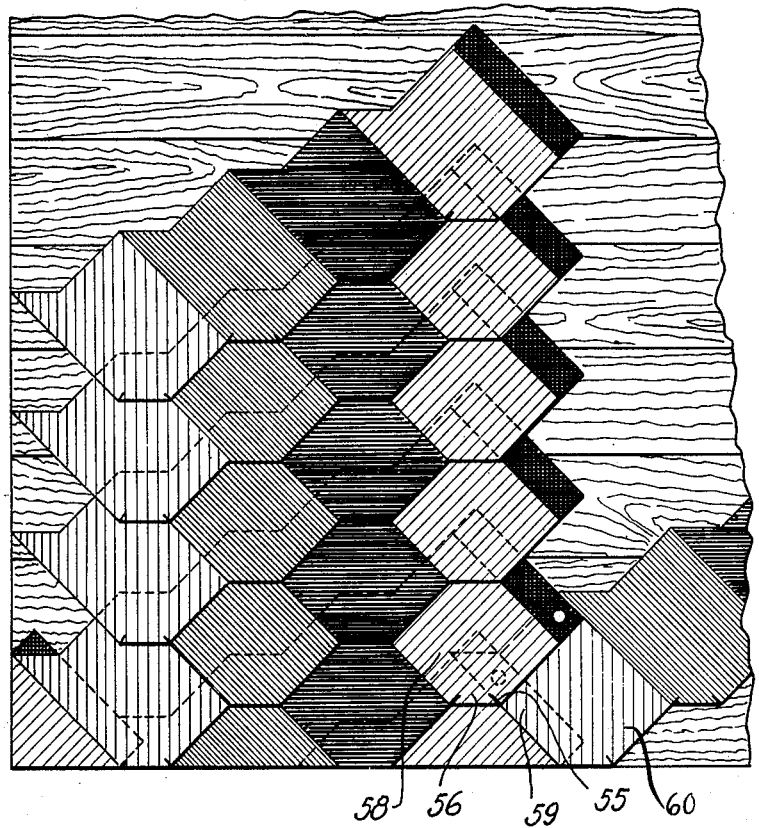

Of the accompanying drawings, Fig. 1 is a plan view of a plurality of shingles which embodies the features of my invention and which illustrates the manner of finishing and cutting the web; Fig. 2 is a plan view of a single shingle materially enlarged; Fig. 3 is a plan view of a plurality of the shingles as they appear when laid on the roof; Fig. 4 is a plan view of a plurality of shingles similar to the shingle of Fig. 2 but illustrating a modified manner of marking the web; Fig. 5 is a plan view of the shingles of Fig. 4 as they appear when laid on the roof; Figs. 6 to 10, inclusive, illustrate the cleats which may be used in laying the shingles; Fig. 11 is another modification of the manner of marking the web and also of cutting the shingles from the web; Fig. 12 is an enlarged view of a single shingle similar to those of Fig. 11; Fig. 13 is a fragmental edge view of the left hand end of the shingle of Fig. 12; Fig. 14 is a plan view of a plurality of the shingles of Fig. 12 as they appear when laid on the roof; Fig. 15 is a modification in the manner of cutting the web as shown in Fig. 11; Fig. 16 is a plan view of one of the shingles of Fig. 15; and Fig. 17 illustrates the manner of laying on the roof the shingles illustrated by Fig. 16.

The shingles 10 illustrated by Figs. 1 to 3, inclusive, are what are ordinarily called in the trade strip shingles. They are adapted to be formed into rows 11 when assembled on the roof, with the shingles in each row having their adjacent ends lapping and each row lapping on the adjacent underlying row. In forming shingles of this nature, the web 12 is cut crosswise. In this instance, the cuts 13 are made entirely across the sheet and at right angles to the long edges of the web. It will be understood, however, that these cuts may be inclined if desired.

Before the web is cut, it is marked in any suitable manner by stripes 14, 15, etc. These stripes may be the result of making the web itself, or they may be formed by coloring matter or otherwise, when the web is finished. In this instance, the stripes 14 are lighter in color and appearance than the stripes 15, so that a fairly clear line marks the boundary between the two stripes. This line may be in the nature of a very narrow stripe 16, or it may have the appearance of a line caused by the two contrasting colors at the boundary of the colors. In this particular instance, I have indicated the stripe 14 as brown, the stripe 15 as blue, the stripe 17 as green and the stripe 18 as red. The stripe 19 is not very material as it covers the end of the shingles which are overlapped by the other shingles in the same rows. In practice, when making any ordinary shingles I prefer to form this stripe merely by omitting any mineral or other coloring matter therefrom.

From all of this it will be seen that I provide, in this manner, shingles which are substantially of the same shape and appearance throughout but which have, when in the form of an ordinary strip shingle, clearly defined figures; in this instance, the figures are rectangular in shape. It will be seen that these figures can be made of varying widths or lengths, depending upon the widths of the stripes on the web, and they can be of varying colors or intensities of shades, and there can be as many figures on the shingles as may be desired. Furthermore, the rectangular shape is not essential to my invention.

When these shingles are laid on the roof they may be assembled in rows 11, with the ends 19 lying under the ends 20 of the adjacent shingles of the same row, and with the lower edges of each row lapping on the upper edges of the adjacent underlying row. By shifting the rows with reference to each other the figures formed thereon may be made to incline to one side or the other, as the case may be. In this instance, I have shown the rows of figures inclined to the left from the lower edge. But obviously, they might be inclined to the right or might run straight up the roof at right angles to the eaves, if desired. With composition shingles, by omitting the granulated mineral in forming the stripes 19 the lapping stripe is made thinner, and the overlapping end is elevated less from the roof.

What I wish to emphasize in this application is the defining of a boundary between figures not only on the roof but on the shingles themselves. As is apparent, when assembled on the roof the exposed edges define a portion of the boundary of the figures, but the remainder of the boundary of each figure, whether on the roof or on the shingles, may be defined nicely by the junction of the contrasting colors or light intensities. Particularly, when viewed at a distance these junctions appear as distinct lines or edges of the figures.

However to make the junctions appear more definite I may provide, as explained, actual lines or stripes 16; or these may be employed without the contrasting colors or intensities, as will be explained hereinafter. For convenience herein I will specify any such junction or lines or stripes as definition lines, that is, lines actual or apparent which define, in part at least, the boundary of the figures.

Fig. 4 illustrates a modified form of the web-marking which, when the shingles are formed and assembled, gives the appearance somewhat as indicated in Fig. 5. In this instance, the stripes 25 are composed of a series of short sections 26 and 27 of unlike color or intensity. When these shingles are formed by cutting the web transversely along the lines 28, the shingles produced are similar to those of Fig. 2, although the figures formed, or the colors thereof, might be modified. But, as the individual strips formed in each group, 29, 30, etc., are unlike those of the other groups, the strips, when laid in a haphazard manner on the roof, will form clearly defined figures; in this instance, rectangular parallelograms; but these figures will not be in definite rows and will have varying positions with reference to other similar figures. In this way, a novel and striking appearance is produced without any materially increased labor or expense and without any special effort on the part of the workman. A bunch of shingle strips, as cut, will include a number of each of these differently marked strips and these will be mixed in a haphazard manner when they reach the workman and will be laid by him accordingly.

Figure 6:
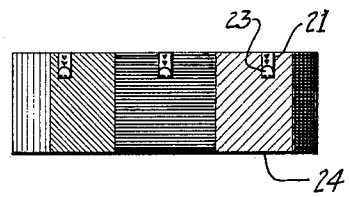

If it is desired, the step of cutting along lines 28 may be omitted and instead of producing a shingle strip as shown in Fig. 6 I may produce a shingle formed by cutting along the transverse junction lines only. This shingle comprising a group of the before mentioned short sections is to be distinguished from the strip shingle shown in Fig. 6, and I desire it to be understood that it is within the purview of my invention to use either type, depending upon the effects desired.

Any suitable method can be used for marking the webs with the particular stripes indicated, but with any ordinary method there would be more or less of a merging into each other of the colors at their junctions at the ends of the short stripes, and this I have indicated at the ends of the short stripes in Fig. 4. This is not shown in Fig. 5 as it is not a material part of the present invention, and it will be understood that the irregularity caused by this merging of the stripes could be eliminated by cutting out a narrow strip of the web between each two sections of unlike stripes. In Fig. 5 the definition lines are indicated by the numeral 31, and the shingle edges by the numeral 32.

In order to prevent warping or any tendency of the lap edge of the shingles from turning upwardly, I provide cleats 21 which may be made of any suitable material such as metal. These cleats are fixed to the upper portion of the shingles in any suitable manner. I prefer to fasten them to the shingles by means of prongs 22 cut from the cleats. These prongs are forced through the shingles and are clinched on the rear side. A loop 23 is formed on the lower end of each cleat under which is slipped the lap edge 24 of the underlying shingle. These cleats not only hold the lap edges down, but they provide guides for positioning the shingles as they are laid.

Figures 9, 10:
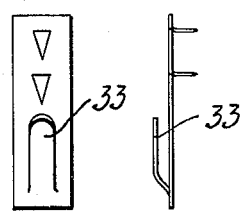

Figs. 9 and 10 illustrate a modified form of cleat in which the loop is formed by cutting a portion from the body of the cleat. These loops need not be bent outwardly from the body until the shingles are being laid, and hence are less bulky.

The shingles of Figs. 11 to 14, inclusive, are formed somewhat in the manner as the shingles hereinabove described. The stripes 35 may be formed in any suitable manner on the web; but, in order to modify the shape of the shingles, I incline the transverse cut, as indicated, and, instead of making it a straight line cut, I make it a zigzag cut so as to produce the zigzag edges 36 and 37 on the shingles. In this case also, the end 38 which is to be lapped over by the adjacent shingle may be formed by omitting the granulated mineral, and the other end 39 of the shingles is preferably formed with a thin edge 40 so as to cause this edge to be elevated as little as possible above the surface of the overlying shingle.

In this instance also, the stripes are adapted to assist in forming well defined figures on the roof. In this case, the figures 49 are hexagonal in shape and they are formed in rows inclined upwardly to the left. A consideration of any particular figure will show that the upper and lower edges 41 of the figures are formed by the edges of the shingles, that the upper left hand and the lower right hand edges 42 are formed also by the edges of the shingle, but that the other edges 43 of the shingle are formed by the boundary between the two contrasting colors, forming definition lines. In this shingle clearly defined definition lines 43 are formed on the web and thus on the shingles.

A consideration of Fig. 14 will show that, by forming on the end 39 the thin edge 40 the overlying end 39 will lie more snugly or lower on the roof. In this way the end 39 of each shingle will be in contact with the surface of the portion 45 of the underlying shingle. This is assisted by forming the lapped end 38 thinner, as explained above.

A further consideration of Fig. 14 will show that the design which, in this instance, is hexagonal in shape is the combined result of the stripes 35 on the web, the manner of cutting the web transversely and, finally, the manner of lapping each row of the shingles on the adjacent row. It will be seen that, when the shingle 46 is lapped on the shingle 47, the figure will not be symmetrical unless the lap is made as is indicated. Otherwise the corner 49 of the shingle 46 might not register with the definition line 43 of the shingle 47, or the upper and lower edges of the hexagon figures might be of unlike lengths.

Figs. 15 to 17, inclusive, illustrate a modification of the shingles of Figs. 11 to 14, inclusive. The shingles of Fig. 16 may be substantially the same as the shingles of Fig 11, although it will be understood that the colors and the shapes of the edges might be modified materially without departing from the spirit of my invention. In this instance, however, I provide slits 55 so that the workman, in laying the shingles, can bend the sections 56 downwardly and thus bring all portions of the exposed edges in contact with the underlying shingle. The portion 56 of the shingle 58 normally would be raised by the end 59 of the underlying shingle 60. The other slits 57 are provided so, in case the first sections 59 or the first two sections are cut from the shingle for laying near the edge of the roof or for any other reason.

I claim as my invention:

1. The method of making shingles, comprising the steps of forming continuous longitudinal parallel strips of short sections of contrasting appearance on the surface of a web of shingle material, cutting said web at substantially the junction of said sections to form a plurality of shingles, each having figures thereon of varied appearance from one another and from correspondingly positioned figures of other shingles in said web.

2. The method of making shingle strips, comprising the steps of forming continuous parallel stripes of short sections of contrasting appearance with adjacent sections in transverse alignment on the surface of a web of shingle material, cutting said web along transverse lines some of which extend through lines formed by the ends of the sections and some of which are positioned between said lines to form a plurality of shingle strips, each having parallelograms thereon of varied appearance from those in the same strip, and from correspondingly positioned parallelograms of other strips of other sections, said strips when laid at random on a roof producing a haphazard effect.

3. The method of making shingles comprising the steps of forming continuous stripes of short sections of contrasting appearance on the surface of a web of shingle material, cutting said web at the junction of said sections to form a plurality of shingles each having figures thereon of varied appearance from one another and from correspondingly positioned figures of other shingles in said web, each shingle having cut edges of irregular appearance, said strips when laid at random on a roof producing a haphazard broken effect.

In testimony whereof, I hereunto set my hand.

NORMAN P. HARSHBERGER.